United States Patent [19]

Charvillat

[11] Patent Number: 5,315,586
[45] Date of Patent: May 24, 1994

[54] RESOURCE REALLOCATION FOR FLOW-ENFORCED USER TRAFFIC

[75] Inventor: Eric Charvillat, Tokyo, Japan

[73] Assignee: NEC Corporation, Japan

[21] Appl. No.: 905,794

[22] Filed: Jun. 29, 1992

[30] Foreign Application Priority Data

Jun. 28, 1991 [JP] Japan .................................. 3-157240

[51] Int. Cl.⁵ ............................................ H04J 3/26
[52] U.S. Cl. ........................................ 370/60; 370/61; 370/94.1
[58] Field of Search ...................... 370/17, 60, 60.1, 61, 370/79, 84, 85.6, 85.7, 94.1, 94.2, 94.3, 95.1, 110.1, 118

[56] References Cited

U.S. PATENT DOCUMENTS

| | | | |
|---|---|---|---|
| 5,029,164 | 7/1991 | Goldstein et al. | 370/79 X |
| 5,130,982 | 7/1992 | Ash et al. | 370/60 X |
| 5,163,046 | 11/1992 | Hahne et al. | 370/80 X |
| 5,164,938 | 11/1992 | Jurkevich et al. | 370/60.1 X |

*Primary Examiner*—Douglas W. Olms
*Assistant Examiner*—Melvin Marcelo
*Attorney, Agent, or Firm*—Ostrolenk, Faber, Gerb & Soffen

[57] ABSTRACT

In a packet (ATM) network, a source node at the entry of the network is responsive to a connection request from a user terminal for invoking a CAC (call admission control) algorithm to accept or reject the request depending on the amount of resource requested by the user, and allocates a portion of a free bandwidth resource exclusively to the user for the duration of the call according to established contract parameter values. Each node of the network responds to a reallocation request from the user for transmitting a copy of the request to a downstream node to elicit an acceptance message therefrom, and reserving a portion of a pool bandwidth resource and invoking the CAC algorithm to additionally reserve a portion of the free bandwidth resource. The node proceeds to allocate the reserved pool bandwidth to the user in response to the acceptance message indicating that the same amount of the reserved pool bandwidth is available in the downstream node. The allocation of the pool bandwidth is temporary. When a portion of the free bandwidth resource is reserved using the CAC algorithm, this portion is exclusively allocated to the user until the end of the call and the temporarily allocated pool bandwidth is returned to the pool resource for other users.

15 Claims, 15 Drawing Sheets

UPC CONTROL PROCEDURE

Initial State

Temporary Pool Resource Allocation

Swapping of Reserved Pool with Reserved Free Bandwidth

REALLOCATION PROCEDURE (USER TERMINAL)

DEALLOCATION PROCEDURE (USER TERMINAL)

DEALLOCATION PROCEDURE (ALL NODES)

REALLOCATION MESSAGE FLOW (FAILURE IN FIRST NODE)

LEGEND: A = TRIGGERING OF REALLOCATION
B = USER IS NOTIFIED OF REJECTION

REALLOCATION MESSAGE FLOW (FAILURE IN SECOND NODE)

LEGEND: A = TRIGGERING OF REALLOCATION
B = USER IS NOTIFIED OF REJECTION

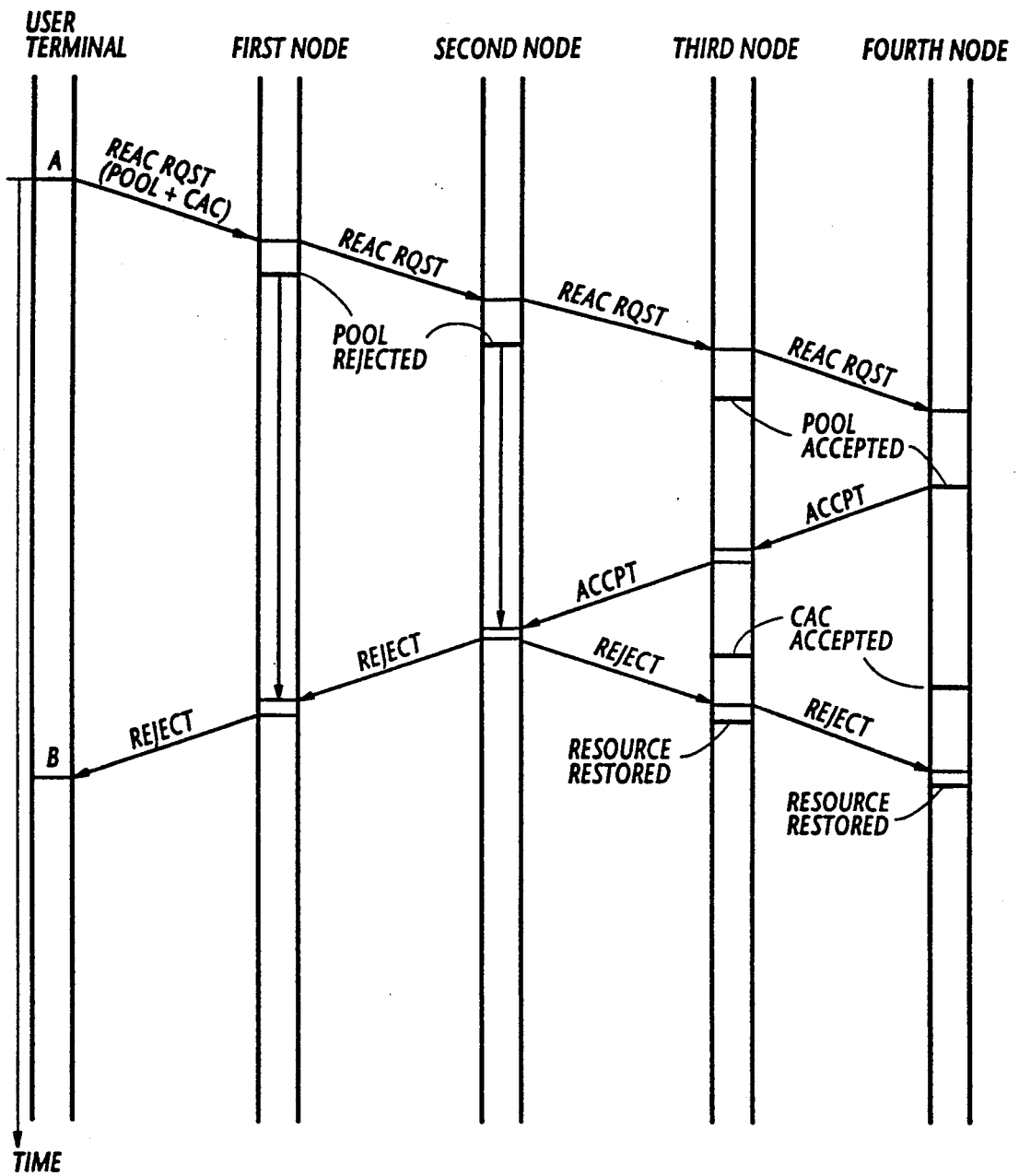

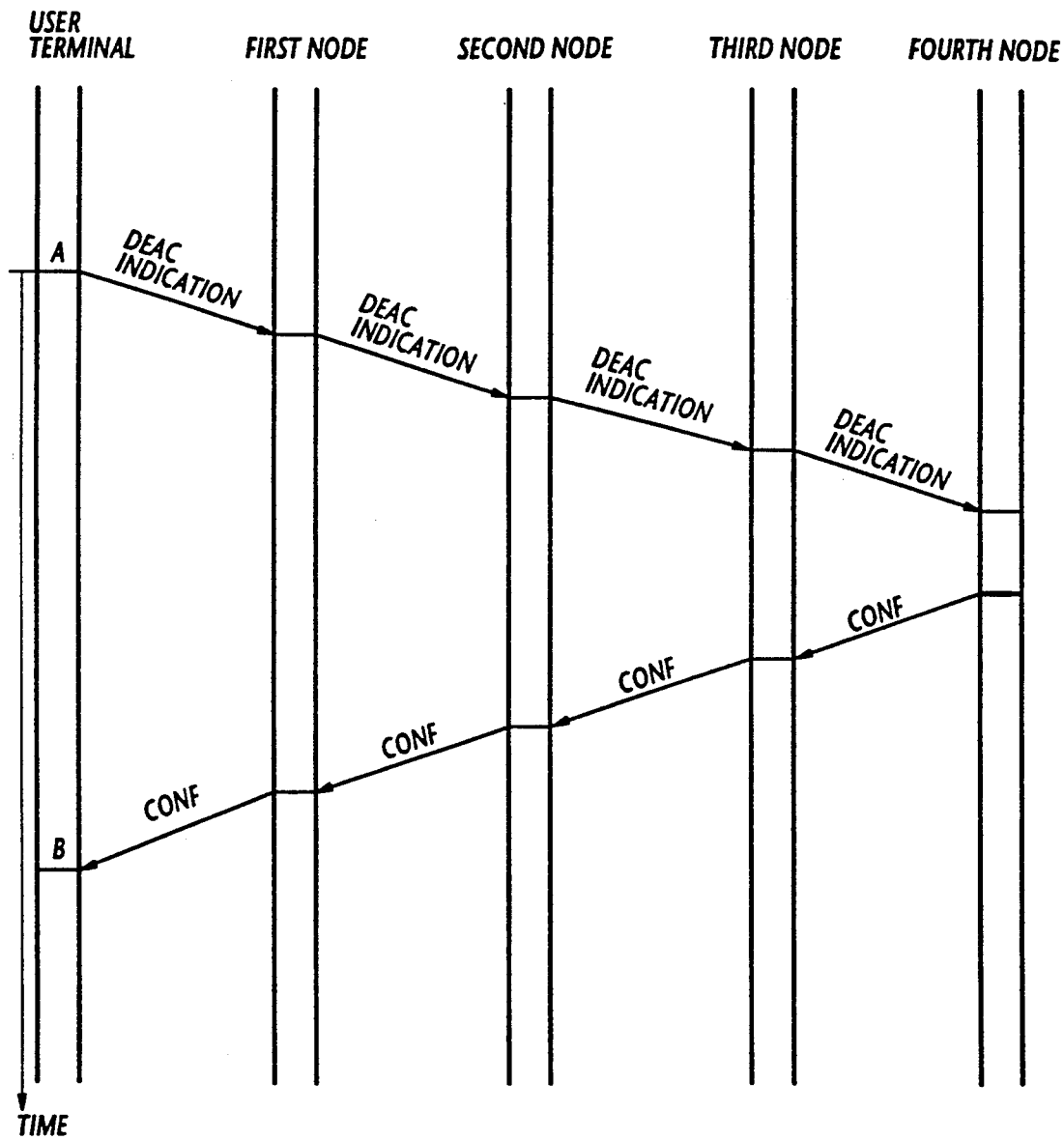

RESOURCE REALLOCATION FOR FLOW-ENFORCED USER TRAFFIC

BACKGROUND OF THE INVENTION

The present invention relates generally to integrated packet networks where the transmission efficiency is gained by statistical multiplexing effect of VBR (variable bit rate) sources, and more specifically to such a network where police functions are required to guarantee the quality of service established at call setup by controlling the bit rate behavior of user terminals.

In broadband integrated services digital networks (BISDN) where a wide range of broadband services are provided using the asynchronous transfer mode (ATM) technique, information is packetized and carried in fixed length "cells", which may be statistically multiplexed with other traffic into a high-bit rate channel. To ensure satisfactory quality of service (QOS) for all network users call admission control (CAC) and traffic enforcement (policing) control have been proposed and recommended by CCITT. Call admission control algorithm decides whether a new virtual channel connection should be admitted to the network based on the current network status such as available resources and cell loss performance, and contract parameters (such as mean traffic rate and peak traffic rate) are established. The traffic enforcement scheme monitors each individual virtual channel connection to ensure that its cell-level traffic flow in the network conforms to the contract parameters established at call setup time.

However, if statistical multiplexing gain is to be achieved, precision cell-level traffic control on variable bit rate (VBR) traffic is difficult to achieve since the user has little knowledge on the characteristics of its VBR traffic at call setup time.

SUMMARY OF THE INVENTION

It is therefore an object of the present invention to provide a flow enforcement arrangement which ensures precision cell-level traffic control by allowing user terminals to issue a request to increase the amount of bandwidth allocated at call setup time.

According to a broader aspect of the present invention, there is provided a network node for a packet network. The node comprises a call admission control (CAC) device responsive to a connection request from a user terminal for accepting or rejecting it depending on the amount of resource requested by the user terminal. Contract parameter values are established and a resource is allocated exclusively to the user terminal according to the established contract parameter values for the duration of the call. A flow enforcement device includes a buffer for allowing cells from the call-originating user terminal to be transmitted toward a destination when the contract parameter values are not violated and storing the cells in the buffer when the contract parameter values are violated. A resource reallocation means is provided to respond to a reallocation request from the user terminal when the occupancy of the buffer is higher than a predefined value for allocating an additional resource to the user terminal.

According to a specific aspect, the present invention provides a packet network including a plurality of network nodes interconnected by transmission links. One of the network nodes that is located at an entry of the network comprises the flow enforcement means. Each of the network nodes comprises a resource allocation means which is responsive to a connection request from a user terminal for invoking the CAC algorithm to accept or reject the connection request depending on the amount of resource requested by the user terminal, to establish contract parameter values, and to allocate a portion of a free bandwidth resource exclusively to the user terminal for the duration of the call according to the established contract parameter values. Resource reallocation means is provided in each network node to respond to the reallocation request from the user terminal for transmitting a copy of the reallocation request to a downstream node to elicit an acceptance signal therefrom, and reserving a portion of a pool (commonly shared) bandwidth resource and invoking the CAC algorithm to reserve a portion of the free bandwidth resource. The resource reallocation means proceeds to allocate the reserved pool bandwidth to the user terminal in response to the acceptance signal from the downstream node indicating that the same amount of the reserved pool bandwidth is available in the downstream node. The user is now allowed to transmit cells at a reallocated rate. The allocation of the pool bandwidth is temporary. When a portion of the free bandwidth resource is reserved using the CAC algorithm, this reserved portion is permanently allocated to the user (or until the end of the call or until a deallocation is performed) and the temporarily allocated pool bandwidth is returned to the pool resource for other users.

BRIEF DESCRIPTION OF THE DRAWINGS

The present invention will be described in further detail with reference to the accompanying drawings, in which:

FIGS. 12 to 15 are flow diagrams of messages transmitted through the network during a reallocation procedure; and FIG. 16 is a flow diagram of messages transmitted through the network during a deallocation procedure.

DETAILED DESCRIPTION

Figure 1:
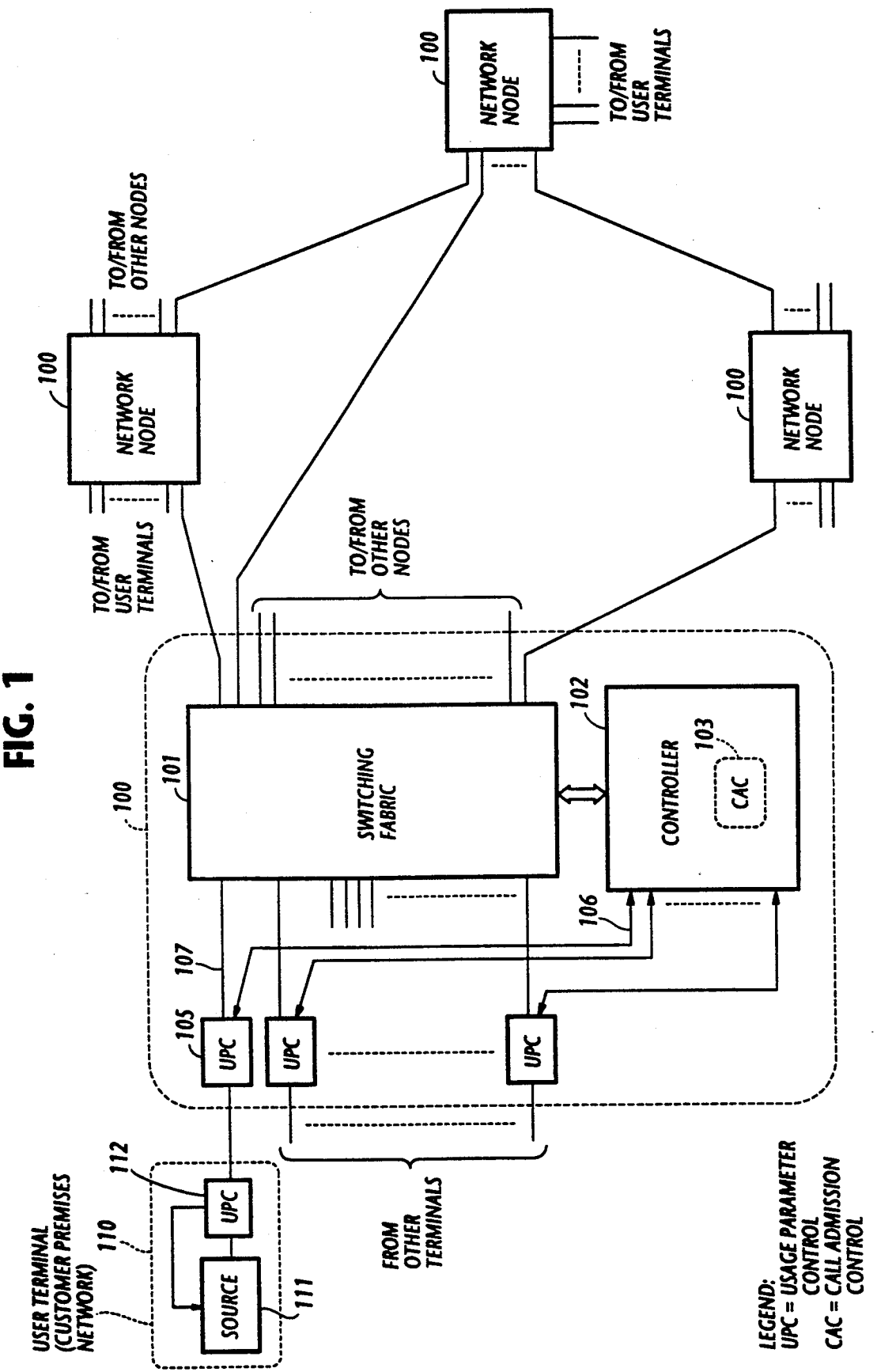
FIG. 1 is a block diagram of a packet network according to the present invention.

Referring now to FIG. 1, there is shown a high-speed packet network embodying the present invention. The network includes a plurality of nodes 100 for serving user terminals (including customer premises networks). In a typical example, some of the nodes may be a switching node including an ATM (asynchronous transfer mode) switching fabric 101 such as Batcher-Banyan network, for example, in which incoming cells are routed under the control of a node controller 102. Other nodes may include a switching fabric or a multiplexer, not shown. The controller 102 includes a call (connection) admission control (CAC) device 103 whose function is specified by CCITT I-series Recommendations. The CAC function decides to accept a new connection on a physical link if the required quality of service (QOS) can be guaranteed for all virtual connections already present on the physical link by determining whether a user is observing or violating a bandwidth contract agreed upon between the user and the network. Violation of the contract may degrade the QOS of other connections present in the network. Hence, a network function, called the policing function or Usage Parameter Control (UPC) function, is required to cater for network protection.

The network node 100 comprises a UPC device 105 associated with the user terminal 110 which statistically multiplexes cells of multiple connections onto a user/-network interface to the UPC device 105 in which policing, or flow enforcement control is performed on every user cell of all connections accepted by the CAC device 103 and established through the UPC device 105.

The UPC device 105 is connected by a control bus 106 to node controller 102 to exchange control signals, and connected by a data line 107 to switching fabric 101. User cells entering the UPC device 105 are policed. As will be described, user cells transmitted at a rate violating predefined contact parameters are stored in a buffer and those not violating the contract parameters are carried through the data line 107 to switching fabric 101. Other cells such as control cells and OA&M (Operations, Administration & Management) cells are simply passed through the UPC device and carried through the data line 107 to the switching fabric 101. All cells entering the switching fabric 101 are transmitted out in a bit-serial fashion.

The user station 110 includes a UPC replica 112 which is a copy of the algorithm of the associated UPC device 105. Specifically, it includes a replica of the buffer of the UPC device in the form of a counter indicating the number of violating cells stored in the UPC buffer. The UPC replica 112 controls the signal source 111 of the user terminal in a feedback loop.

Figure 2:
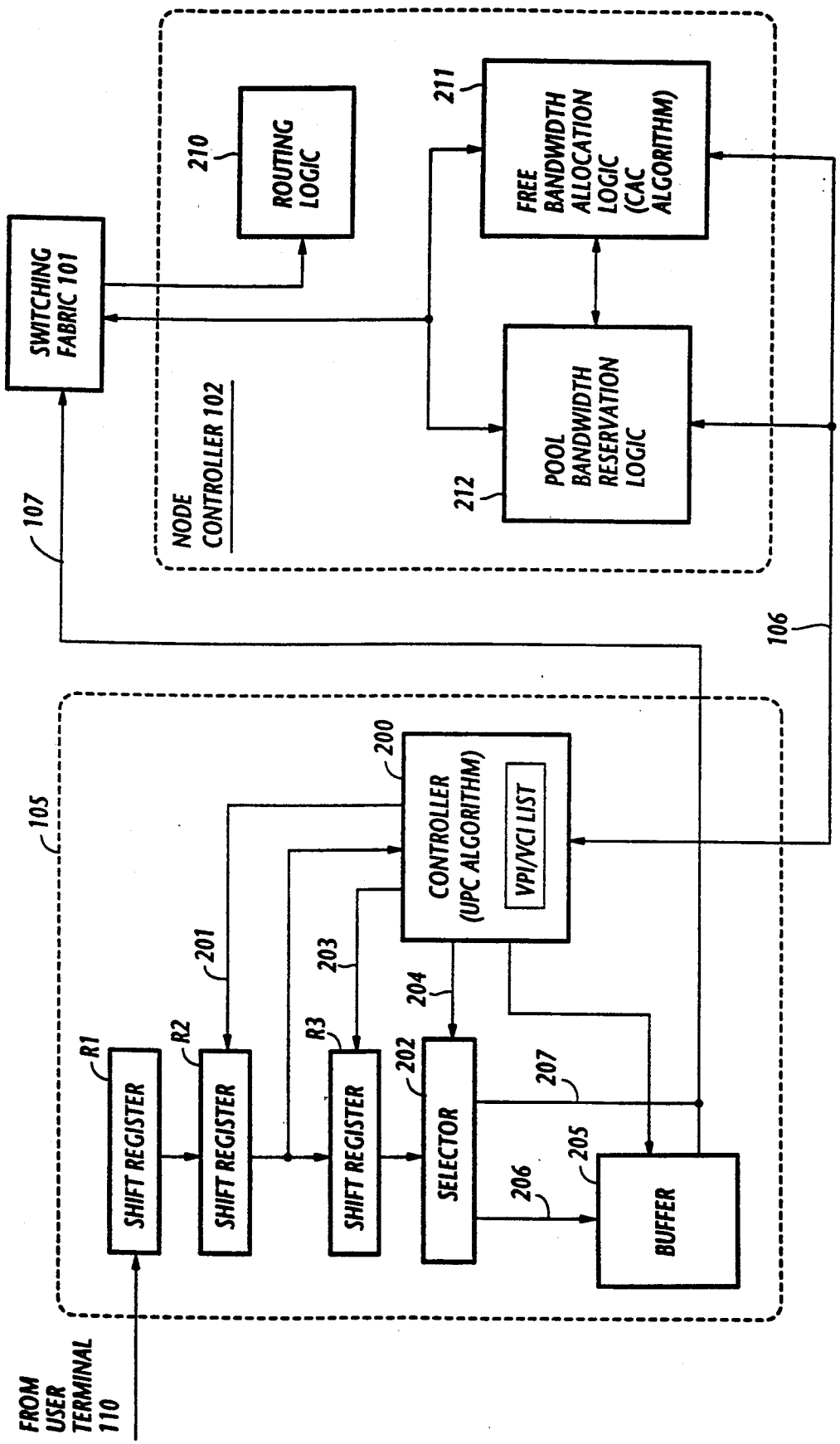
FIG. 2 is a block diagram showing details of a UPC (usage parameter control) device and essential components of a node controller in which a CAC (call admission control) algorithm is incorporated.

As shown in FIG. 2, the UPC device 105 includes a shift register R1 for receiving ATM (53-byte) cells from user terminal 110. On receiving all incoming 53 bytes of data, shift register R1 transfers its contents in parallel fashion to a second shift register R2 whose outputs are coupled to a third shift register R3. The contents of register R2 are supplied in parallel to register R3 in response to a transfer signal on lead 201 from a UPC controller 200, and the VCI/VPI (virtual circuit identifier/virtual path identifier) and P/T (payload type) fields of the cell stored in register R2 are supplied to a controller 200. The contents of shift register R3 are transferred to a selector 202 in response to a transfer signal on lead 203 from controller 200. Selector 202 is responsive to a control signal supplied on lead 204 from controller 200 to apply the contents of register R3 in parallel to the through leads 206 to the buffer 205 or serially through line 207 to the data line 107 to which the output of buffer 205 is connected. UPC controller 200 is connected through control bus 106 to the node controller 102 and includes a memory containing a VCI/VPI list of established connections.

The node controller 102 essentially comprises a routing logic 210 for routing cells through the switching fabric, a free bandwidth allocation logic 211 in which the CAC algorithm is incorporated, and a pool bandwidth reservation logic 212. Free bandwidth allocation logic includes a resource reallocation logic according to the present invention as well as the known CAC algorithm. As will be described, a control cell containing a connection request entering the switching fabric 101 through line 107 is applied to free bandwidth reservation logic 211 to determine the admission of the connection according to the CAC algorithm. After the connection is established, a control cell containing a reallocation request from the user terminal is routed through the switching fabric and fed into both the free bandwidth allocation logic 211 and pool bandwidth allocation logic 212, which cooperates with logic 211 to allocate an additional bandwidth resource to the requesting user terminal.

Figure 3:
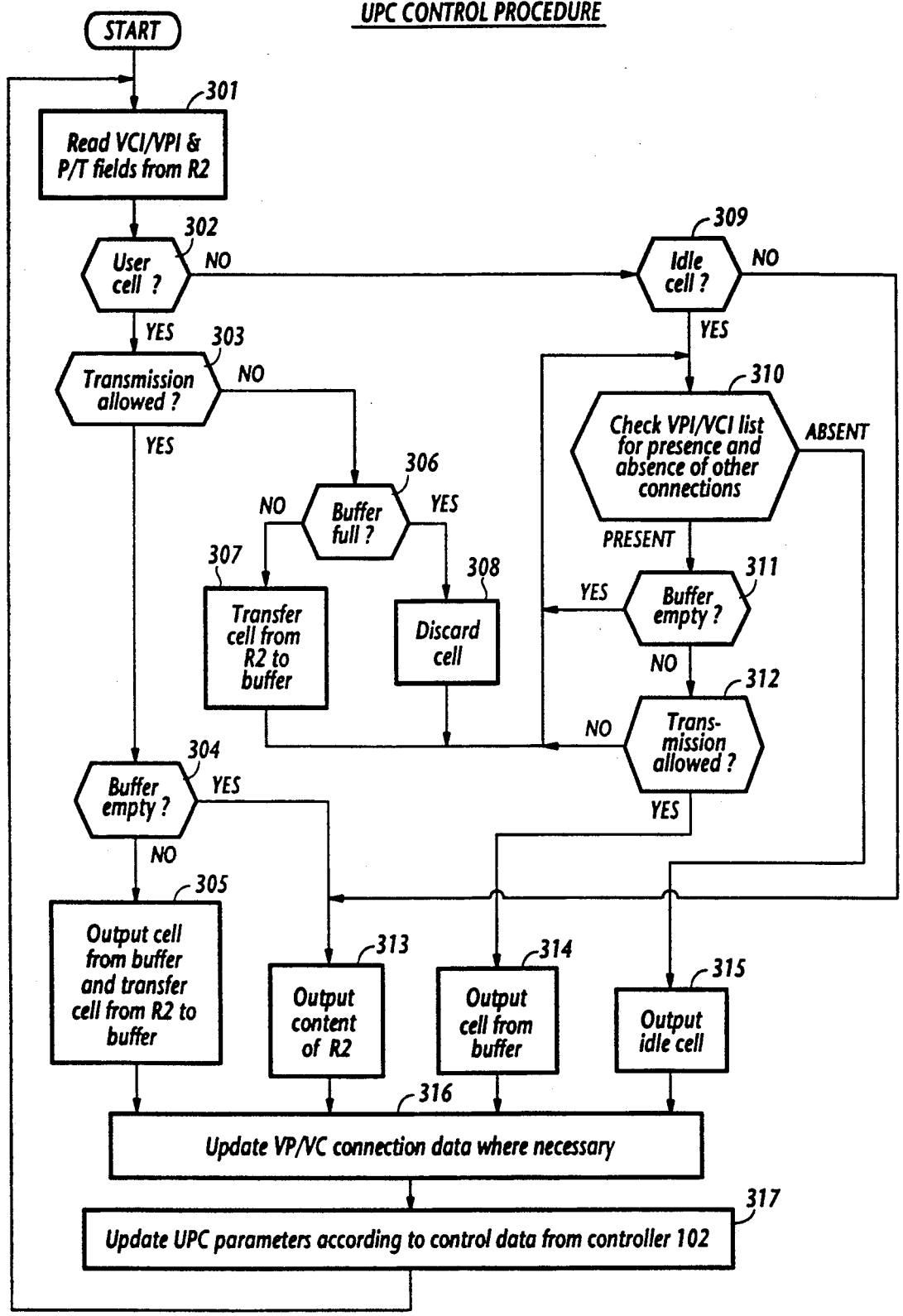
FIG. 3 is a flowchart describing a sequence of steps performed by the UPC device.

The operation of the UPC controller 200 is visualized by a flowchart shown in FIG. 3. The program execution starts with block 301 which directs the reading of VCI/VPI and P/T fields of a cell from register R2. Exit then is to step 302 to check the P/T field to see if it indicates that the cell is a user cell or not. If the answer is negative, control branches at step 302 to step 309 to check to see if the cell is an idle (empty) cell or not. If the cell is a control cell or an OA&M cell, exit is to step 313 to deliver the current cell through data line 107 to the switching fabric 101. If the current cell is empty, control branches at step 309 to step 310 to check the VPI/VCI field of the current cell against the VPI/VCI list to determine if other connections have already been established. If there are no other connections, control branches at step 310 to step 315 to output the idle cell to the data line 107. If other connection is present, control branches to step 311 to check the contents of buffer 205 to determine if one or more cells of such a connection are waiting. If there is one, the buffer is said to be not empty for that connection and control branches to step 312 to check to see if the UPC algorithm allows the current cell to be transmitted. If the answer is negative, control returns to step 310 to determine if there are other established connections. By repeating steps 310, 311 and 312, every connections are polled in a Round-Robin manner for waiting cells. If the answer is affirmative in step 312, control exits from the loop and enters step 314 to output the current cell. If there is no cell of other connection waiting in buffer 25, the buffer is said to be empty for that connection, and control branches at step 311 to step 310.

According to the present invention, the total bandwidth resource of the line controlled by UPC device 105 is partitioned into two resources. As shown in FIG.

4A, it is initially divided into a free bandwidth resource as indicated at 400 and a pool bandwidth resource 401 which is commonly shared by all connections established through the UPC device. As a connection is established, free bandwidth is used so that the amount of free bandwidth decreases as new connections are established.

Figure 4A:
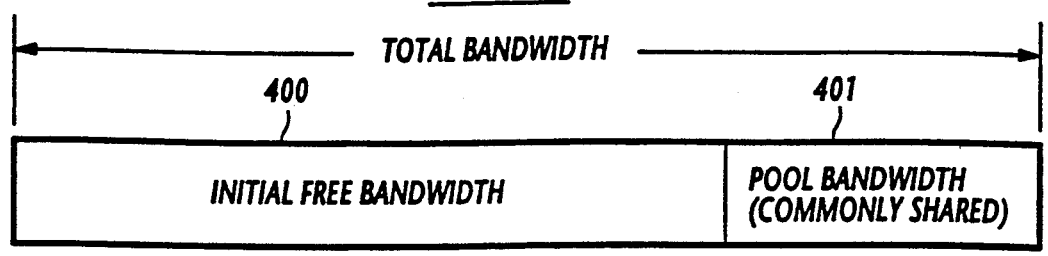
FIGS. 4A and 4B are schematic illustrations of the total bandwidth resource of the UPC device, with FIG. 4A showing the initial state in which the total resource is initially partitioned into two allocation areas and FIG. 4B showing successive allocations of resources from a free bandwidth resource when calls are established.
Figure 4B:
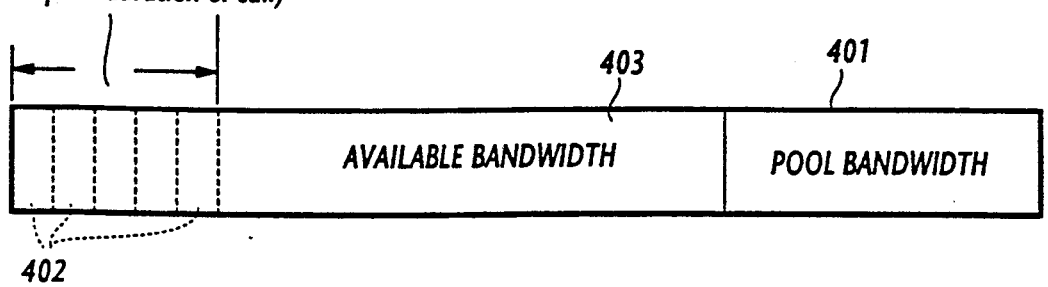

More specifically, during a call setup phase, a control cell is passed through UPC device 105 following the execution of step 313, and enters the switching fabric 101 where it is examined by the CAC device 103 of node controller 102 to accept or reject the call depending on the amount of resource requested by the user and determine contract parameter values if the call is accepted. Depending on the contract parameter values determined for a given connection, the CAC device 103 allocates an amount of resource as shown at 402 in FIG. 4B from the free bandwidth resource and saves it as a permanent resource to be exclusively used by that connection. Therefore, the amount of the CAC-bandwidth resource successively increases with an increase in accepted calls and the amount of available free bandwidth resource decreases as indicated at 403.

Returning to FIG. 3, if the cell is determined to be a user cell, control branches at step 302 to step 303 to check to see if the UPC algorithm allows the current cell to be transmitted. If the user traffic is not violating the contract parameters defined at the call setup time, control branches at step 303 to step 304 to check the contents of buffer 205 to see if other cells of the same connection are waiting therein. If such waiting cells are not present, the buffer is empty for the current connection and control branches at step 304 to step 313 to deliver the current cell in register R2 through register R3 and selector 202 to output line 107. If the answer is negative in step 304, control branches to step 305 to deliver a waiting cell from buffer 205 and store the current cell into buffer 205.

If the user traffic is violating the contract parameters defined at the call setup time, control branches at step 303 to step 306 to check the contents of buffer 205 to see if the buffer is full. If it is, the current cell is discarded (step 308). If the buffer is not full, the current cell is stored into buffer 205 (step 307). Exit from either steps 307 and 308 is to step 310 to examine other connections in a manner as described above.

Execution of either of steps 313, 314 and 315 is followed by step 316 in which the VP/VC connection data are updated if necessary. The controller then enters step 317 to wait for control data from the node controller 102 concerning establishment of new connections, clearing of existing connections, and modifications of existing connections (reallocation/deallocation) and update UPC parameters according to such control data before the arrival of the next cell. Control now returns to the starting point of the program to repeat the above process on the next cell.

Since the network node has a limited knowledge of the characteristics of user traffic and since the variation of the traffic is unpredictable, the occupancy of buffer 205 should be kept at a point below the almost-full level of the buffer to prevent discarded cells from reaching a dangerously high number.

According to the present invention, a reallocation scheme is used to prevent cells from being discarded by allowing users to increase the amount of their allocated resource when buffer occupancy exceeds a predefined threshold and decrease it when the allocated resource is under-used. A resource reallocation request can be generated by a triggering mechanism located in the UPC replica of the user terminal. The bandwidth resource allocated to a user is bounded by a maximum fixed value which is pre-declared by the user and is typically equal to the peak rate of the user traffic (or the line speed of the link. e.g., 150 Mbps). The buffer threshold is determined on the basis of the buffer size and on the round-trip propagation delay of a reallocation request/reallocation response messages along the transmission path from the request-originating terminal to the destination node.

To avoid overflow under worst case traffic (wherein the input traffic rate is equal to its maximum rate from the time the reallocation request is issued), it is necessary that during the round-trip propagation delay time Td, the buffer does not overflow. If W is the window size, $M_1$ and $M_2$ the number of cells in the window corresponding to the policed rate and the maximum rate, respectively, and $\tau$ the length of a timeslot, then the buffer occupancy, Td seconds after it was equal to the threshold Th, becomes:

$$\frac{Td}{\tau} \times \frac{(M_2 - M_1)}{W} + Th$$

If this value exceeds the buffer size N, then overflow occurs.

Because some users may produce such a continuous stream of cells that the CAC device 103 is too slow to take each burst from the same source as a single call and perform call admission control on each burst, the reallocation process must be executed on a real-time basis.

Figure 5A:
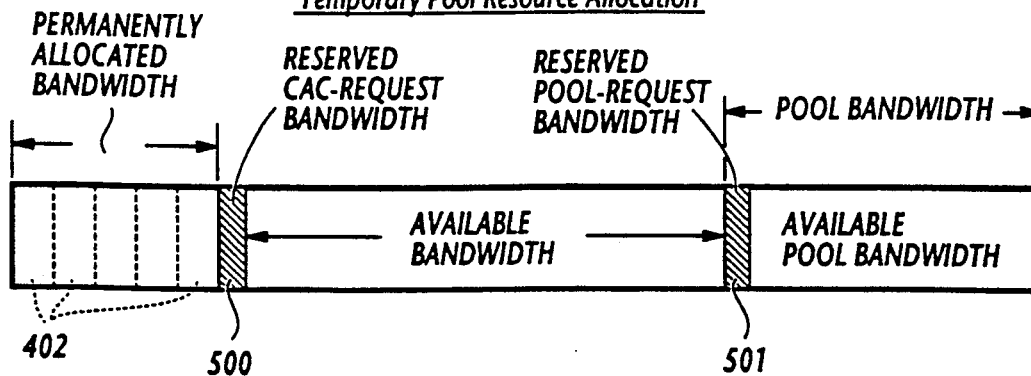
FIGS. 5A and 5B are schematic illustrations of the bandwidth resource with FIG. 5A showing a resource reservation phase in which pool and free bandwidth resources are reserved and FIG. 5B showing a resource swapping phase in which reserved resources are exchanged with each other when a favorable response is received from a downstream node.

Briefly described, a reallocation request from a user terminal or from an upstream side of the network includes a CAC-request and a pool-request, each requesting an equal amount of additional bandwidth. The CAC-request invokes a process for reserving a portion of the free bandwidth according to the CAC algorithm as indicated at 500 in FIG. 5A and the pool-request invokes a process for reserving a portion 501 of the pool bandwidth. The reallocation request from the user is first received by a source node located at the entry of the network and a copy of this request is instantly transmitted to a downstream node to elicit a response indicating whether an attempt to reserve a pool bandwidth is successful or not. The request is further relayed to the next node until it reaches a destination node so that a response is successively relayed along the route from a downstream node to the next until it reaches the source node. Since the reservation of the pool resource is not associated with the CAC algorithm, it is processed faster than the reservation of the free bandwidth resource. If the response is a favorable one indicating that the pool reservation is successful, the user is informed of this fact by the source node and the reserved pool bandwidth is allocated to the user in addition to the already allocated bandwidth.

Figure 5B:
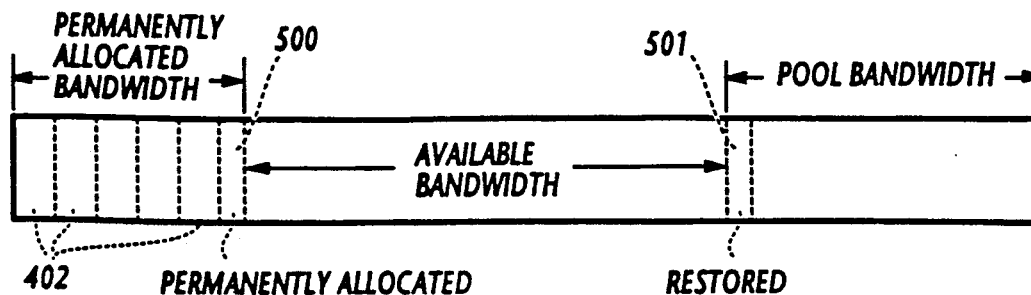

Since the free bandwidth allocation procedure by the CAC algorithm is a time-consuming task, the reservation of free bandwidth portion 500 may occur after the reception of a confirmation response from the source node. When the CAC-request is finally accepted, the reserved free bandwidth portion 500 is permanently allocated to the user for as long as it needs it and the temporarily allocated pool bandwidth portion 501 is restored to the pool resource as shown in FIG. 5B.

Therefore, at the final stage of the reallocation process, the reserved free resource and the allocated pool resource are exchanged, or "swapped" with one another. In response to a favorable response from the downstream node, a confirmation message is transmitted from the source node to the downstream node and relayed along the transmission route to the destination node to allow each subsequent node on the route to effect the "swapping" of the resources. If the first response from the downstream node is unfavorable, a copy of this message is transmitted along the route downstream to restore the allocated pool resources.

Figure 6:
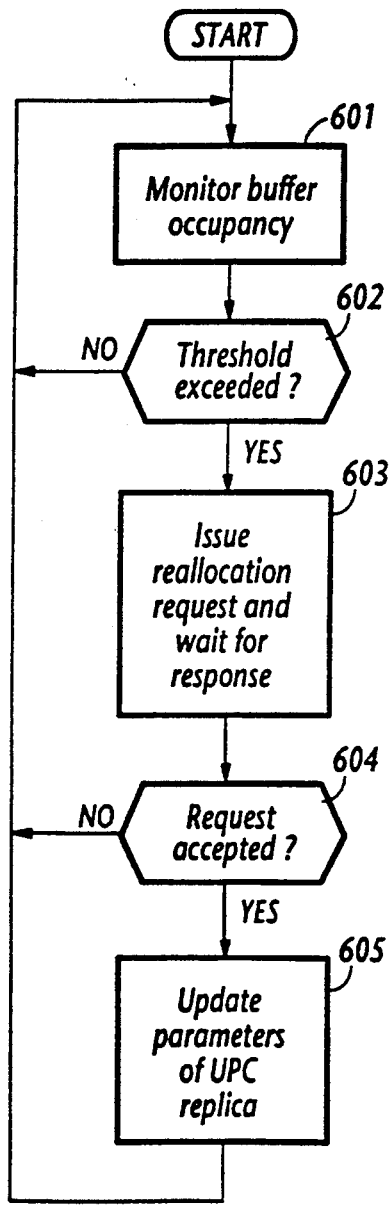
FIG. 6 is a flowchart of programmed instructions performed by the user terminal for triggering a reallocation procedure.

A reallocation request is initially transmitted from a user terminal. FIG. 6 is a flowchart of programmed instructions incorporated in the algorithm of the UPC replica of the user terminal for triggering a reallocation process. The program execution starts with step 601 in which the occupancy of the buffer replica is monitored. If the buffer occupancy is below a predefined threshold which is determined on the basis of the buffer size and the round-trip propagation delay of a reallocation request/reallocation response along the transmission path from the requesting terminal to the CAC mechanism of the destination node (step 602), control returns to step 601 to continue monitoring the buffer's filling level, and if it exceeds the threshold, control branches to step 603 to issue a reallocation request to the network and wait for a response (acceptance or rejection message). If an acceptance message is received from the network (step 604), control branches to step 605 to update the parameters of the UPC replica, and control returns to the starting point of the program. The user then can transmit cells at a reallocated rate.

Figure 7:
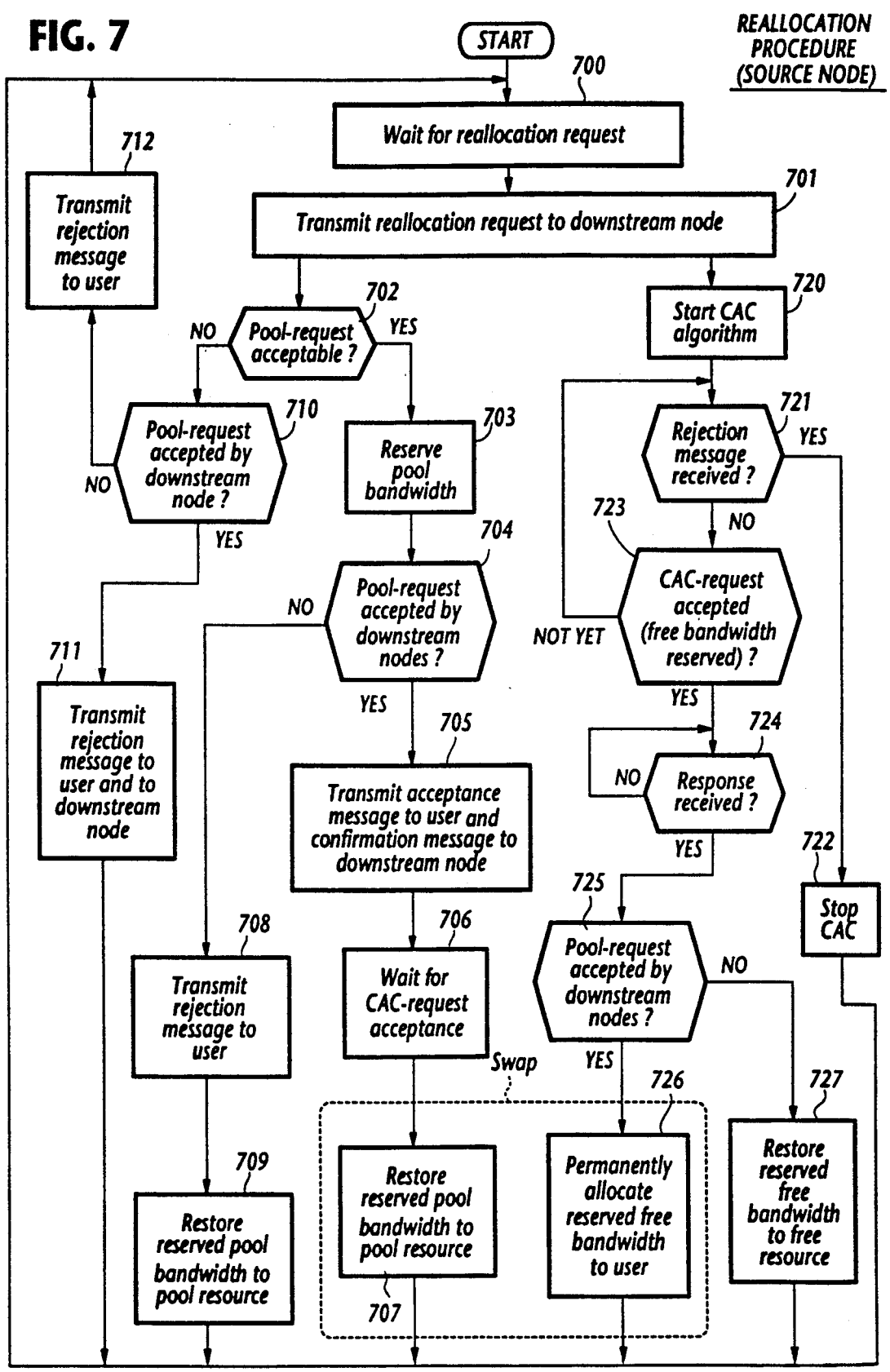
FIGS. 7 to 9 are flowcharts of instructions programmed in the node controller of source, tandem and destination network nodes, respectively.
Figure 8:
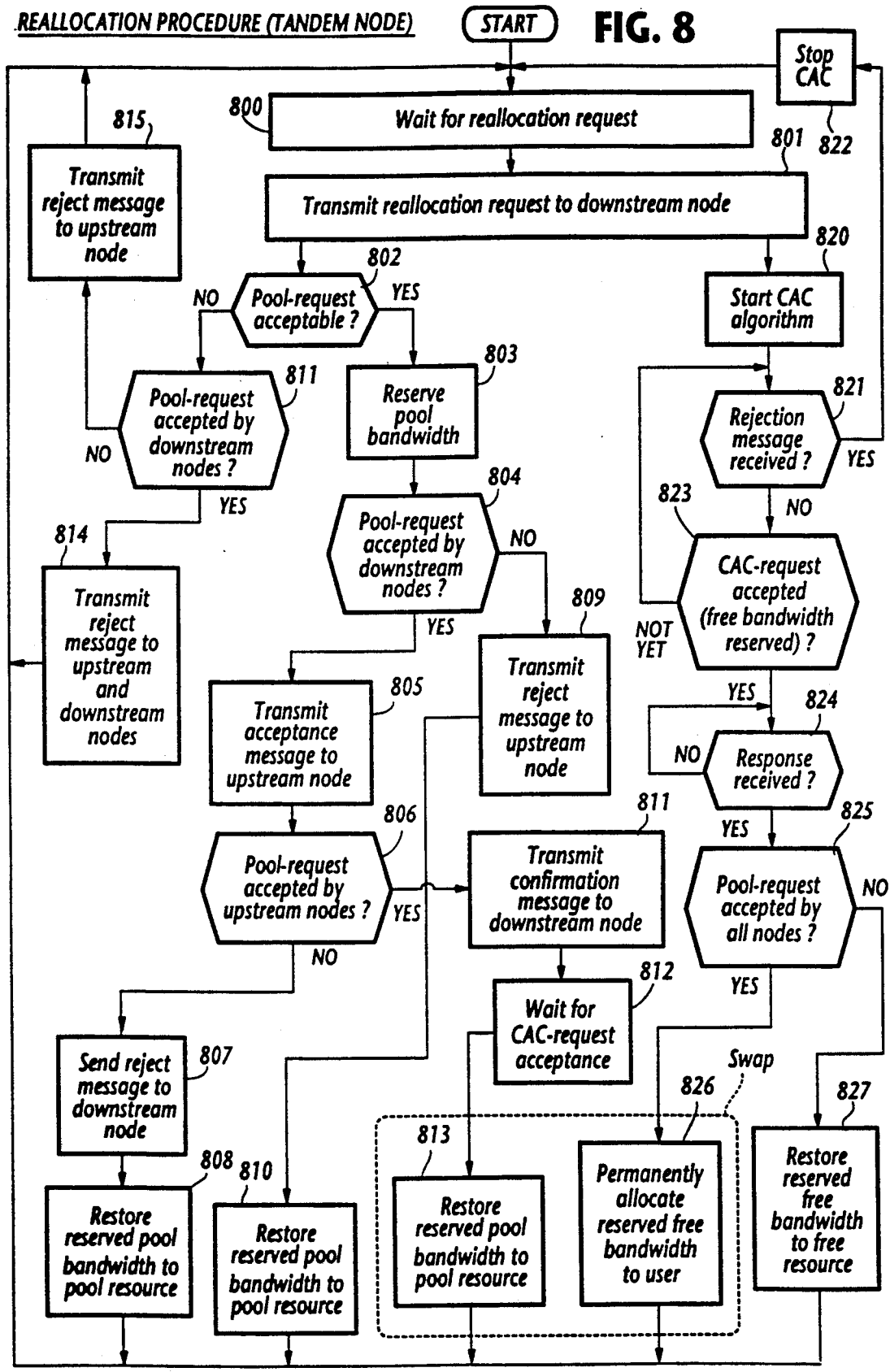
Figure 9:
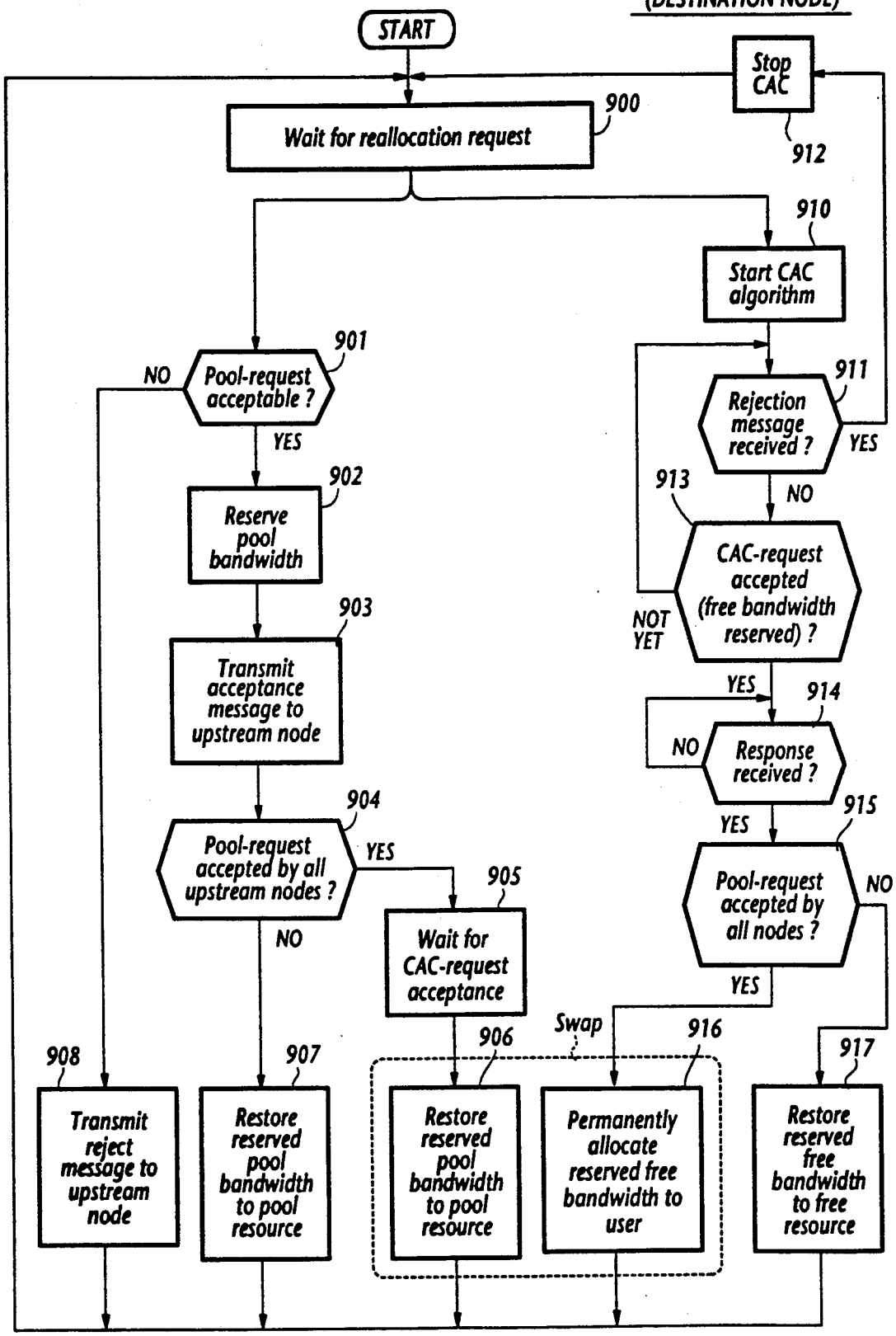

FIGS. 7, 8 and 9 are flowcharts of programmed instructions to be performed by the node controller of source, tandem and destination nodes of the network, respectively, during a reallocation procedure. In each of these flowcharts, a pool reservation subroutine is shown on the left side of the drawings and a free bandwidth allocation subroutine on the right side.

In FIG. 7, the node controller 102 of a source node is constantly waiting for a reallocation request from a call-originating user terminal (step 700). If it receives one, control exits to step 701 to transmit to the downstream node a copy of the reallocation request containing a pool request and a CAC request, and invokes simultaneously a pool-request resource reservation subroutine and a CAC-request resource allocation subroutine. The pool bandwidth reservation subroutine begins with step 702 to check to see if the pool request is acceptable to the source node. If the answer is affirmative, control branches at step 702 to step 703 to reserve a portion of the pool bandwidth resource. Exit then is to decision step 704 to check to see if the source node has received an acceptance message from the tandem node indicating that the same amount of pool bandwidth is available in the tandem node or if it has received a rejection message. If the pool request is accepted by the tandem node, control branches at step 704 to step 705 to transmit an acceptance message to the user indicating that the reallocation request was accepted by the network and a confirmation message to the downstream node. Simultaneously, the UPC parameters of the requesting user in the source node as well as the corresponding parameters of the UPC replica in the user's premises are updated. Exit then is to step 706 to wait for an indication that the CAC-request is accepted by the CAC algorithm. When this indication is given, control exits to step 707 to restore the reserved pool bandwidth to the pool resource. Control now returns to the starting point of the program.

If the pool request is not accepted by the tandem node, control branches at step 704 to step 708 to transmit a rejection message to the user and proceeds to step 709 to restore the reserved pool bandwidth to the pool resource, and control returns to the starting point of the program.

If the pool request is not accepted by the source node, control branches at step 702 to step 710 to check whether a pool request was accepted by the downstream node. If the answer is affirmative, a rejection message is sent to the user and the downstream node (step 711); otherwise, the same message is sent only to the user (step 712).

Simultaneously with the execution of the pool resource reservation subroutine, a free resource allocation subroutine is started with step 720 that invokes the CAC algorithm. If a rejection message is received during the execution of the CAC algorithm (step 721), the free resource allocation subroutine is aborted (step 722). As long as no rejection message arrives, the subroutine continues executing until the CAC request is accepted (step 723). When the CAC request is accepted (meaning that free bandwidth has been reserved), control branches out to step 724 to wait for a response from the downstream node in case it has not arrived yet. The answer from the downstream node is checked for acceptance or rejection of the pool bandwidth by the downstream nodes (step 725). If the answer is affirmative, control branches out to step 726 to permanently allocate the reserved free bandwidth to the user, and send a signal to the pool reservation control logic to restore the reserved pool bandwidth to the pool resource (step 707). This represents the "swapping" of resources between the reserved pool resource and the reserved free bandwidth. Control now returns to the starting point of the program.

In FIG. 8, the node controller 102 of a tandem node is constantly waiting for a reallocation request from a source node (step 800). The same processes are executed by steps 800, 801, 802, and 820 through 827 corresponding to steps 700, 701, 702, and 720 through 727 of FIG. 7 and no description is repeated for simplicity. Starting from step 802, if the pool-request is not acceptable, similar steps are executed as in FIG. 7 with the exception that the user is now an upstream node. If the pool request is acceptable, steps 803 and 804 are executed as in FIG. 7. If the pool request is rejected by any downstream node (step 804), control proceeds to step 809 to transmit a rejection message to the upstream node and the reserved pool bandwidth is restored (step 810). If the pool request is accepted (step 804), control proceeds to step 805 to transmit an acceptance message to the upstream node and control waits for a response from the upstream node. If the response is a confirmation message (step 806), control proceeds to step 811 to transmit a copy of the confirmation message downstream and control waits for an indication that the CAC-request was accepted by the CAC algorithm (step 812), followed by the simultaneous execution of steps 813 and 826 where the reserved pool bandwidth is swapped with the reserved free bandwidth. If the response in step 806 is a rejection message, control branches out to step 807 to transmit a copy of the rejection message downstream and control restores the reserved pool bandwidth (step 808).

In FIG. 9, the node controller of a destination node is waiting for a reallocation request from an upstream node (step 900). The same processes are executed by steps 900, 901, 902 and 910 through 917 corresponding to steps 700, 702, 703 and 720 through 727 of FIG. 7 and no description is repeated for simplicity. Starting from step 903, an acceptance message is transmitted upstream and control waits for a response message from the upstream node. If the response is a confirmation message (step 904), control proceeds to step 905 to wait for an indication that the CAC-request was accepted by the CAC algorithm, followed by the simultaneous execution of steps 906 and 916 where the reserved pool bandwidth is swapped with the reserved free bandwidth. If the response in step 904 is a rejection message, control branches out to step 907 to restore the reserved pool bandwidth.

According to a further feature of the present invention, the buffer occupancy of the user terminal is constantly monitored to detect when it reduces below a predefined level. If it occurs, a deallocation procedure is triggered to decrease (deallocate) the amount of the bandwidth resource allocated to the user by restoring a portion of the allocated resource to the free bandwidth resource for other users.

Figure 10:
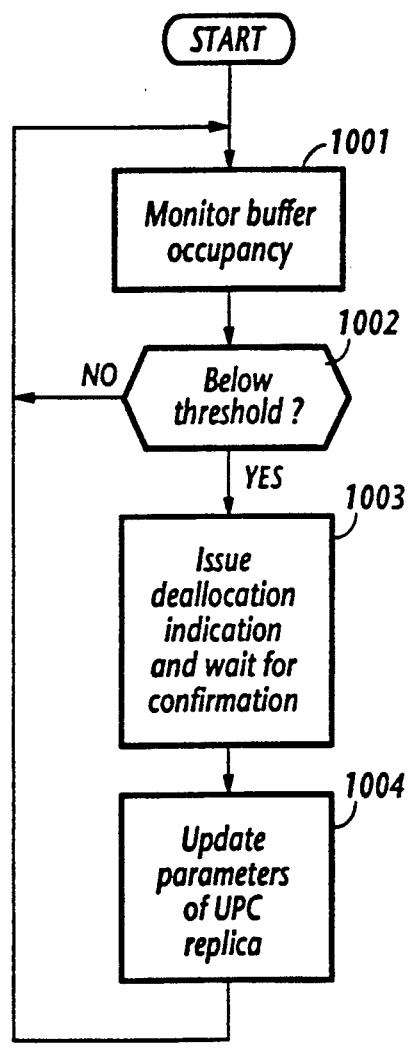
FIG. 10 is a flowchart of instructions performed by the user terminal for triggering a deallocation procedure.

FIG. 10 is a flowchart of instructions performed by the UPC replica of the user terminal for triggering a deallocation procedure. The program execution starts with step 1001 to monitor the occupancy of the user's buffer replica, followed by step 1002 in which the monitored value is compared with a predefined threshold. If the filling level of the buffer replica is below the threshold, a deallocation indication is issued to the network, and control waits for a confirmation message (step 1003) to update the parameters of the UPC replica (step 1004).

Figure 11:
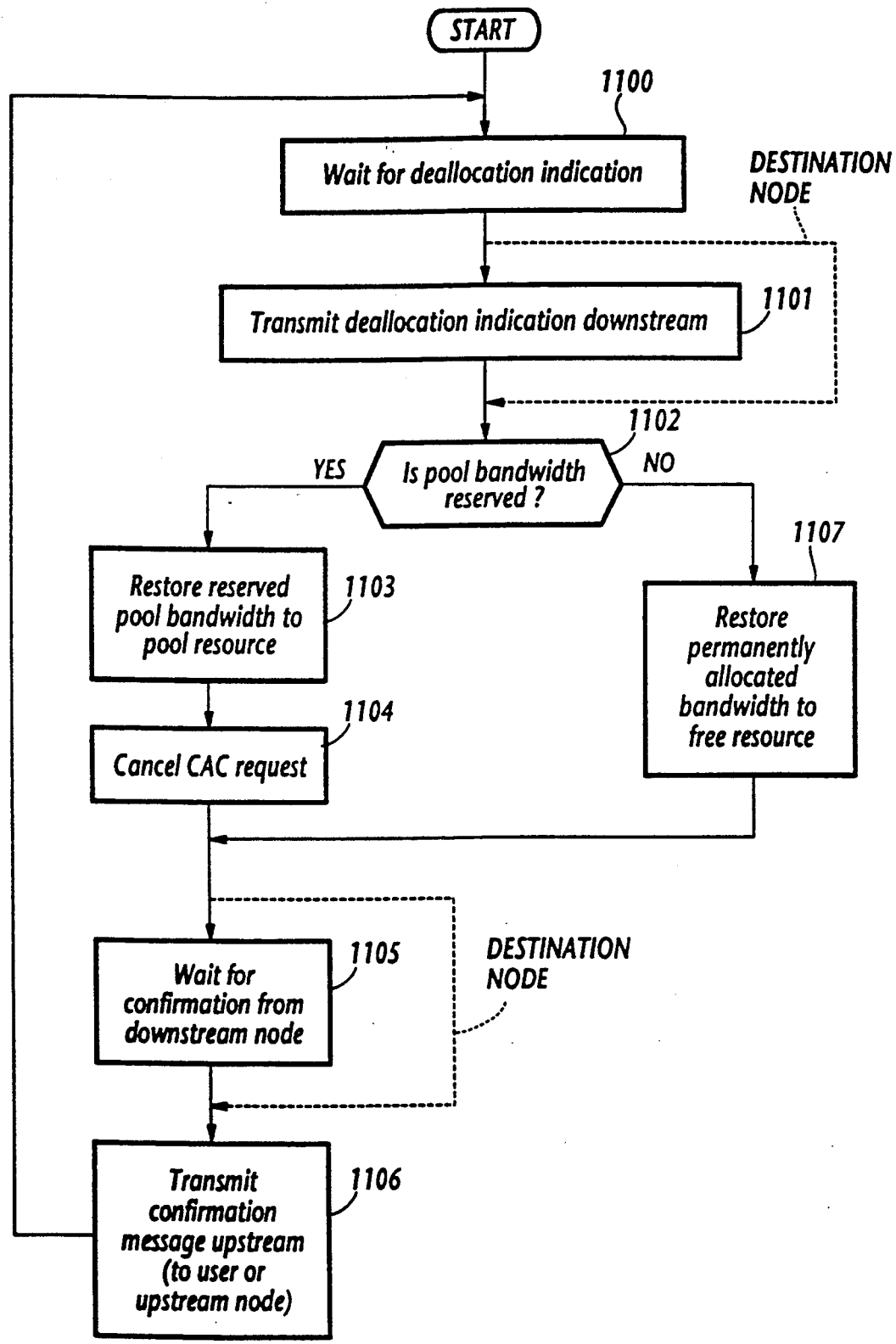
FIG. 11 is a flowchart of instructions performed by the node controller of all network nodes during a deallocation procedure.

In FIG. 11, there is shown a flowchart of operations performed by all network nodes during the deallocation procedure. Each network node is constantly waiting for a deallocation indication from an upstream node (step 1100). Exit then is to decision step 1101 to transmit a copy of the deallocation indication to a downstream node if the node is the source node or a tandem node. Step 1101 is skipped if the node is the destination node. In step 1102, controls checks to see if a pool bandwidth is being reserved by the requesting user. If it is, control branches at step 1102 to step 1103 to restore all or a portion of the reserved pool bandwidth to the pool resource, cancel all or a portion of the CAC-request of the user (step 1104). If no pool bandwidth is allocated to the requesting user (step 1102), control branches at step 1102 to step 1107 to restore a portion of the allocated bandwidth to the free bandwidth resource. After restoring the necessary amount of bandwidth, control waits for a confirmation message from the downstream node if the node is the source or a tandem node (step 1105). If the node is the destination node step 1105 is skipped. Exit then is to step 1106 to transmit a confirmation message to the upstream node. The confirmation message at the end of the restoration of bandwidth is necessary to ensure that the user waits for the deallocation to be completed before issuing a new request.

For a full understanding of the present invention, flow diagrams of reallocation messages are shown in FIGS. 12 to 15 for a transmission path in which four network nodes are assumed to be located.

Figure 12:
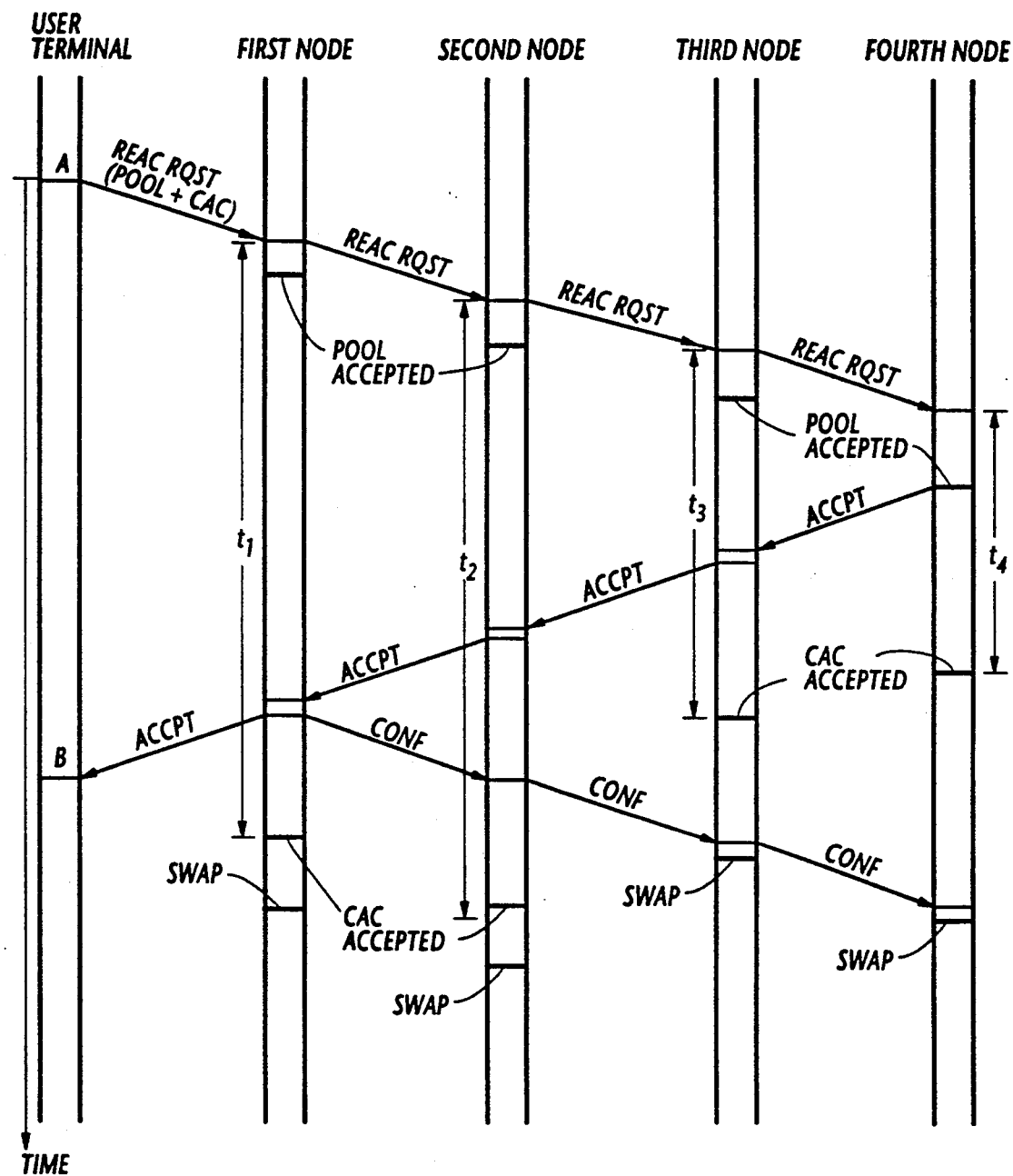

FIG. 12 shows a situation in which the request for reallocation is accepted by all nodes. Since free bandwidth allocation by the CAC algorithm takes time and the amount of time varies from one node to another, it is assumed that different lengths of time $t_1$, $t_2$, $t_3$ and $t_4$ are taken by the first, second, third and fourth nodes, respectively, from the instant each request is received by the respective node.

At the instant of time A, a reallocation is triggered in a user terminal and a reallocation request message is issued by the user terminal and received by the first node at the entry point of the network, where a copy of the reallocation request is instantly sent downstream and the user's pool request is accepted by the first node and a pool bandwidth is reserved, following the transmission of the reallocation request copy. The same process is repeated at the second and third nodes, and finally the request is accepted by the fourth node. Therefore, a pool bandwidth of the same amount is reserved in each of these network nodes. Immediately following the acceptance of the request, an acceptance message is transmitted from the fourth node to the third node where it is copied, with the copy being relayed upstream until it reaches the first node. on receiving an acceptance message from the respective downstream node, each of the third, second and first nodes transmits a copy of the acceptance signal upstream (step 805 at the third and second nodes, and step 705 at the first node). In this way, the requested resource is allocated from the commonly shared bandwidth resource to the user and the user is allowed to transmit cells at the reallocated rate from time B onwards. On receiving an acceptance signal, the first node transmits a confirmation message downstream (step 705) and each of the second and third nodes responds to it by transmitting a confirmation copy downstream (step 807) until it reaches the fourth node (step 904). Each node along the transmission path performs resource swapping between the allocated pool bandwidth and the reserved free bandwidth following the transmission/reception of a confirmation message or following the availability of the free bandwidth, whichever comes last. In the illustrated example, the first and second nodes perform their swapping following the availability of the free bandwidth, whereas the third and fourth nodes perform their swapping immediately following the transmission and reception of a confirmation message. It is seen therefore that, if a reallocation procedure were provided in each node by exclusively relying on the CAC algorithm, the time taken to reallocate an additional resource to the user would be more than the maximum of times $t_1$, $t_2$, $t_3$ and $t_4$.

Figure 13:
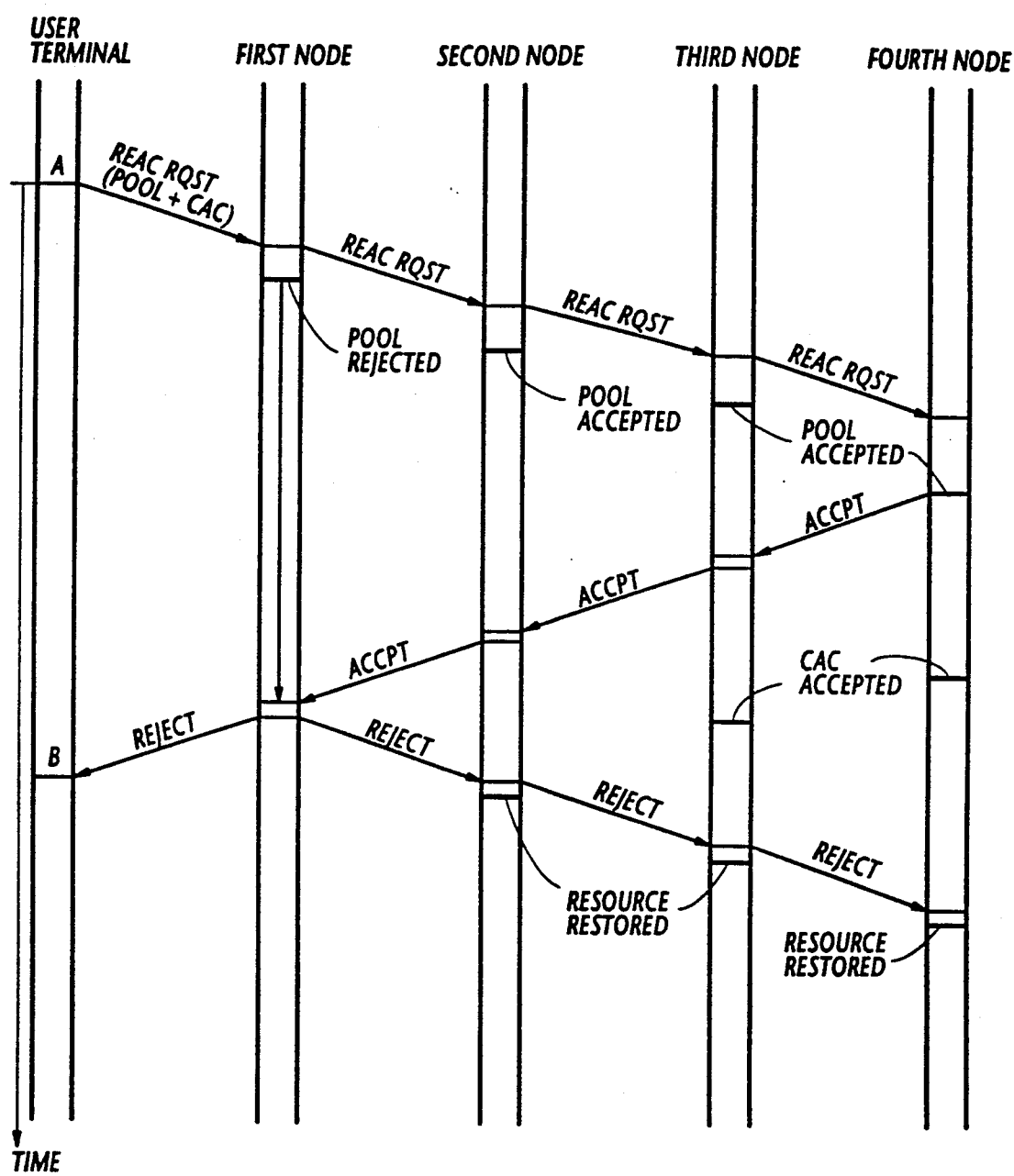
Figure 14:
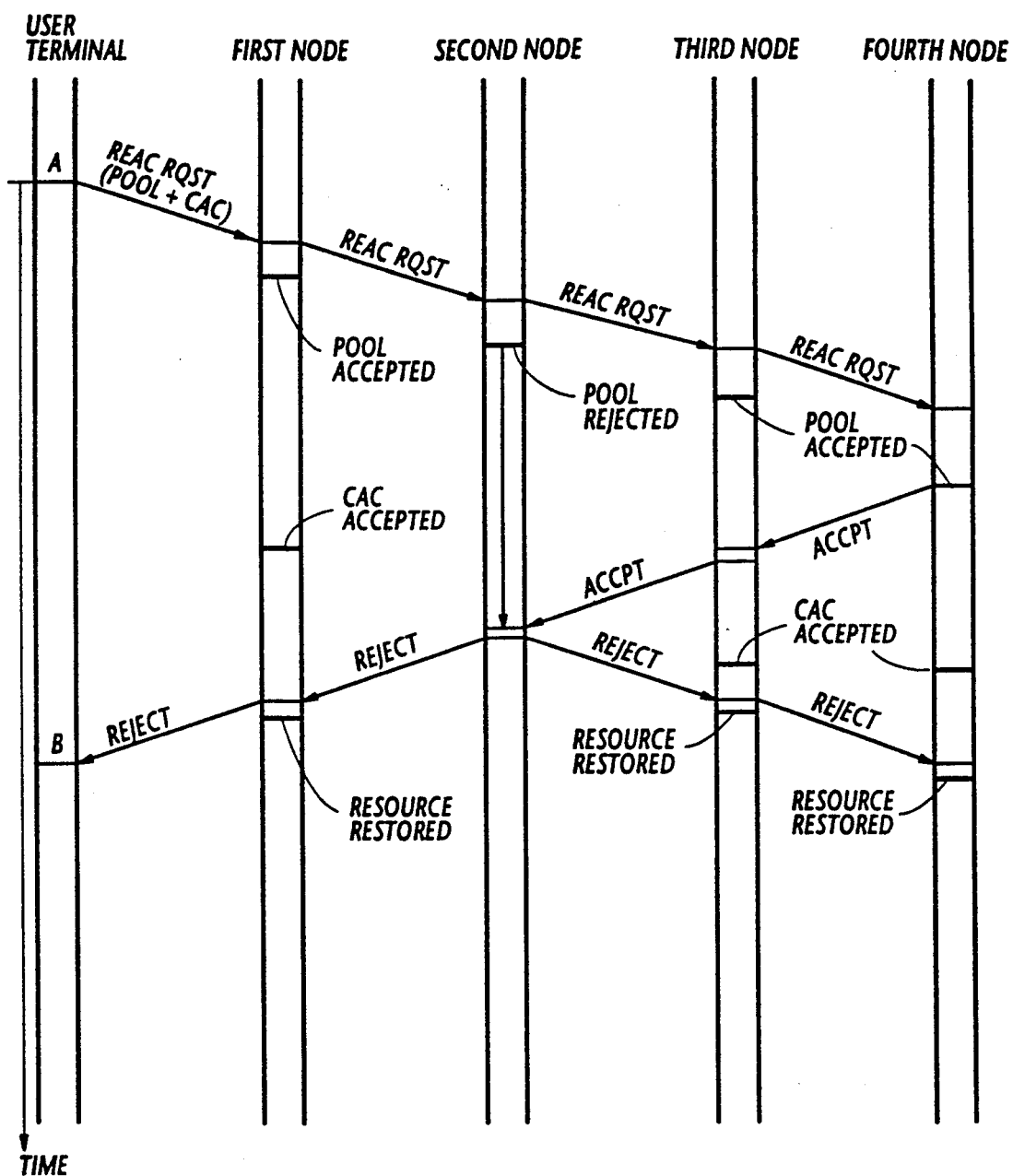

FIGS. 13 to 15 illustrate the flow of control messages in the case of a reallocation failure in one or more of the nodes along the transmission route.

A reallocation fails when at least one node along the transmission path rejects the pool request. When a failure occurs in a node, it must wait for an acceptance/rejection message flow sent upstream from the fourth node to inform the rest of the network of the local failure. If the message received from a downstream node is an acceptance message, then the receiving node is responsible for changing the acceptance message to a rejection message and sending it to the upstream and downstream nodes to inform the upstream nodes that the reallocation must be aborted. If the message received from a downstream node is a rejection message, it indicates that a downstream flow of a rejection message is also generated. On receiving a rejection message, the first node transmits a rejection message to the user.

The user can determine whether to send a new reallocation request to the network based on the parameters of its UPC replica.

FIG. 13 illustrates a situation in which only the first node fails to accept the reallocation request. In that case, a rejection message is transmitted both to the user and the second node following the reception of an acceptance message from the second node (steps 710 and 711) which was originated from the fourth node and relayed through the third node. On receiving a rejection message, each of the second and third nodes restores its reserved pool bandwidth by executing steps 806, 810 and 809, and the fourth node restores its reserved pool bandwidth by executing step 907.

An unsuccessful message flow similar to FIG. 13 is shown in FIG. 14 in which a failure is assumed to have occurred in the second node. In this case, a rejection message is transmitted from the second node both to the upstream and downstream nodes in response to receipt of an acceptance message from the downstream (third) node to cause the other nodes to restore their pool resource.

As shown in FIG. 15, the occurrence of several failures such as in the first and second nodes causes the second node to transmit rejection messages in both downstream and upstream directions in response to an acceptance message from the third node, and the first node simply relays the rejection message from the second node to the user.

FIG. 16 is a flow diagram of a deallocation procedure. When the buffer occupancy decreases below a predetermined level, a deallocation indication is sent to the first node. A copy of the message is relayed downstream by successive nodes and a confirmation message is transmitted upstream from the fourth node and a copy of this message is successively relayed by intermediate nodes to the user. On receiving the deallocation confirmation, the first node sends a deallocation confirmation to the user and then updates its UPC parameters according to the deallocation indication.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A network node for a packet network comprising:
call admission control means responsive to a connection request from a user terminal for accepting or rejecting the connection request depending on the amount of resource requested by the user terminal, establishing a contract parameter value, and allocating a resource to said user terminal according to the established contract parameter value;
flow enforcement means including a buffer for allowing cells from said user terminal to be transmitted toward a destination terminal when said contract parameter value is not violated and storing the cells in said buffer when said contract parameter value is violated; and
resource reallocation means responsive to receipt of a reallocation request from said user terminal when occupancy of said buffer is higher than a predefined value and allocating an additional resource to said user terminal.

2. A network node as claimed in claim 1, wherein said resource reallocation means includes means responsive to receipt of a deallocation indication from said user terminal when the occupancy of said buffer is lower than a predefined value for deallocating a portion of the allocated resources.

3. A network node as claimed in claim 2, wherein said user terminal includes a buffer replica in the form of a counter indicating the number of violating cells stored in the buffer of said node, and means for detecting when said number is higher than said predefined value and generating said reallocation request.

4. A network node as claimed in claim 3, wherein said user terminal includes means for generating said deallocation indication when the occupancy of the buffer replica is lower than a second predefined value.

5. A packet network including a plurality of network nodes interconnected by transmission links, a source node of the network located at an entry of the network comprising flow enforcement means including a buffer for allowing cells from a user terminal to be transmitted toward a destination terminal when a contract parameter value is not violated and storing the cells in said buffer when said contract parameter value is violated, each of said network nodes comprising:
resource allocation means responsive to a connection request from said user terminal for invoking a call admission control (CAC) algorithm to accept or reject the connection request depending on the amount of resource requested by the user terminal, establishing said contract parameter value, and allocating a portion of a free bandwidth resource to said user terminal according to the established contract parameter value; and
resource reallocation means, responsive to a reallocation request transmitted from said user terminal when occupancy of said buffer is higher than a predefined value, for transmitting a copy of the reallocation request to a downstream node to elicit an acceptance signal therefrom, reserving a portion of a pool bandwidth resource and invoking said CAC algorithm to reserve a portion of said free bandwidth resource,
said resource reallocation means of said source node temporarily allocating said reserved portion of the pool bandwidth resource to said user terminal in response to said acceptance signal from the downstream node indicating that same amount of the reserved portion of the pool bandwidth resource is available in said downstream node, and permanently allocating said reserved portion of the free bandwidth resource to said user terminal and restoring the temporarily allocated portion of the pool bandwidth resource.

6. A packet network as claimed in claim 5, wherein said resource reallocation means includes means responsive to receipt of a deallocation indication from said user terminal when the occupancy of said buffer is lower than a second predefined value for deallocating part of the allocated resource portions.

7. A packet network as claimed in claim 5 or 6, wherein said user terminal includes a buffer replica in the form of a counter indicating the number of violating cells stored in the buffer of said source node, and means for detecting when said number is higher than said predefined value and generating said reallocation request.

8. A packet network as claimed in claim 5, wherein said resource reallocation means includes means responsive to receipt of a deallocation indication from said user terminal when the occupancy of said buffer is lower than a second predefined value for deallocating part of the allocated resource portions, and wherein said user terminal includes a buffer replica in the form of a counter indicating the number of violating cells stored in the buffer of said source node, means for detecting when said number is higher than said predefined value and generating said reallocation request, and means for detecting when the occupancy of the buffer replica is lower than a second predefined value and generating said deallocation indication.

9. A packet network comprising at least first and second interconnected network nodes, each of said nodes comprising resource allocation means responsive to a connection request from a user terminal for invoking a call admission control (CAC) algorithm to accept or reject the connection request depending on the amount of resource requested by the user terminal, establishing a contract parameter value, and allocating a portion of a free bandwidth resource to said user terminal according to the established contract parameter value, said first node including:

flow enforcement means including a buffer for allowing cells from said user terminal to be transmitted toward a destination terminal when said contract parameter value is not violated and storing the cells in said buffer when said contract parameter value is violated; and first resource reallocation means responsive to a reallocation request transmitted from said user terminal when occupancy of said buffer is higher than a predefined value for transmitting a copy of the reallocation request to said second node to elicit an acceptance signal therefrom and reserving a portion of a pool bandwidth resource, invoking said CAC algorithm to reserve a portion of said free bandwidth resource, said first resource reallocation means temporarily allocating the reserved portion of the pool bandwidth resource to the user terminal in response to the acceptance signal from the second node, transmitting a confirmation signal to the second node, and permanently allocating the reserved portion of the free bandwidth resource to the user terminal and restoring the temporarily allocated portion of the pool bandwidth resource, said second node including:

second resource reallocation means responsive to the reallocation request from said first node for reserving a portion of a pool bandwidth resource, invoking said CAC algorithm to reserve a portion of the free bandwidth resource of the second node, transmitting said acceptance signal to said first node, said second resource reallocation means permanently allocating the reserved portion of the free bandwidth resource of the second node to the user terminal in response to said confirmation signal, and restoring the reserved portion of the pool bandwidth resource of the second node.

10. In a packet network comprising a plurality of interconnected nodes, each of the nodes including call admission control means responsive to a connection request from a user terminal for accepting or rejecting the connection request depending on the amount of resource requested by the user terminal, establishing a contract parameter value, and allocating a resource to said user terminal according to the established contract parameter value, one of said nodes located at an entry of the network comprising flow enforcement means including a buffer for allowing cells from said call-originating user terminal to be transmitted toward a destination terminal when said contract parameter value is not violated and storing the cells in said buffer when said contract parameter value is violated, a method for controlling traffic of said user terminal, comprising the steps of:

a) transmitting a reallocation request from said user terminal when occupancy of said buffer is higher than a predefined value; and b) receiving said reallocation request at said one network node and allocating an additional resource to said user terminal in response to receipt of said request.

11. A method as claimed in claim 10, further comprising the steps of:

transmitting a deallocation indication from the user terminal when the occupancy of said buffer is lower than a second predefined value; and receiving said deallocation indication at said one node for deallocating portion of the allocated resources in response to receipt of the deallocation indication.

12. In a packet network including a plurality of network nodes interconnected by transmission links, a source node of the network located at an entry of the network comprising flow enforcement means including a buffer for allowing cells from a call-originating user terminal to be transmitted toward a destination terminal when a contract parameter value is not violated and storing the cells in said buffer when said contract parameter value is violated, and each of said nodes comprising call admission control means responsive to a connection request from said user terminal for invoking a call admission control (CAC) algorithm to allocate a portion of a free bandwidth resource to said user terminal and establish said contract parameter value, a method for controlling traffic of the user terminal, comprising the steps of:

a) transmitting a reallocation request from the user terminal when occupancy of said buffer is higher than a predefined value;

b) receiving said reallocation request at said source node, transmitting a copy of the reallocation request to a downstream node to elicit an acceptance signal therefrom and reserving a portion of a pool bandwidth resource;

c) invoking said CAC algorithm to reserve a portion of said free bandwidth resource;

d) receiving said acceptance signal at said source node indicating that same amount of the portion of the pool bandwidth resource reserved by the step (b) is available in said downstream node and temporarily allocating the reserved portion of the pool bandwidth resource to said user terminal; and e) permanently allocating the portion of the free bandwidth resource reserved by the step (c) to the user terminal and restoring the temporarily allocated portion of the pool bandwidth resource.

13. A method as claimed in claim 12, further comprising the steps of:

transmitting a deallocation indication from the user terminal when the occupancy of said buffer is lower than a second predefined value; and receiving said deallocation indication at said source node and deallocating portion of the allocated resource portions.

14. In a packet network comprising a first node located at an entry of the network and a second node, said first node comprising flow enforcement means including a buffer for allowing cells from a user terminal to be transmitted toward a destination terminal when a contract parameter value is not violated and storing the cells in said buffer when said contract parameter value is violated, and each of said first and second nodes comprising call admission control means responsive to a connection request from the user terminal for invoking a call admission control (CAC) algorithm to allocate a portion of a free bandwidth resource to said user terminal and establish said contract parameter value, a method for controlling traffic of said user terminal, comprising the steps of:

a) transmitting a reallocation request from the user terminal when occupancy of said buffer is higher than a predefined value;

b) receiving said reallocation request at said first node, transmitting a copy of the reallocation request from the first node to the second node to elicit an acceptance signal therefrom, and reserving a portion of a pool bandwidth resource of the first node;

c) invoking said CAC algorithm to reserve a portion of said free bandwidth resource of the first node;

d) receiving the copy of the reallocation request at said second node, reserving a portion of a pool bandwidth resource of the second node, transmitting said acceptance signal from the second node to said first node, and invoking said CAC algorithm to reserve a portion of said free bandwidth resource of the second node;

e) receiving said acceptance signal at said first node indicating that same amount of said portion reserved by the step (b) is available in said second node, temporarily allocating said portion reserved by the step (b) to said user terminal, and transmitting a confirmation signal from said first node to said second node;

f) permanently allocating the portion of the free bandwidth resource of the first node reserved by the step (c) to the user terminal and restoring the portion of the pool bandwidth resource of the first node temporarily allocated by the step (e); and g) receiving said confirmation signal at said second node for permanently allocating the portion of the free bandwidth resource of the second node reserved by the step (d) to the user terminal and restoring the portion of the pool bandwidth of the second node reserved by the step(d).

15. A method as claimed in claim 14, further comprising the steps of:

transmitting a deallocation indication from the user terminal when the occupancy of said buffer is lower than a second predefined value;

receiving said deallocation indication at said first node and transmitting a copy of said deallocation indication from the first node to the second node to allow said second node to deallocate part of the allocated resource portions of the second node; and deallocating part of the resource allocated to the user terminal by the first node.

* * * * *